United States Patent [19]

Harshman et al.

[11] 4,234,278
[45] Nov. 18, 1980

[54] LOCKING DEVICES FOR CARGO AND THE LIKE

[75] Inventors: Ray E. Harshman, Anaheim; Archie C. Landry, Canoga Park, both of Calif.

[73] Assignee: Electro-Pneumatic International GmbH, Hansham, Fed. Rep. of Germany

[21] Appl. No.: 956,373

[22] Filed: Oct. 31, 1978

[51] Int. Cl.³ .......................... B60P 7/08; B64D 9/00; B61D 45/00
[52] U.S. Cl. ......................................... 410/69; 410/77
[58] Field of Search .................... 105/463; 410/68, 69, 410/79, 84, 85, 89, 105; 244/118.1

[56] References Cited

U.S. PATENT DOCUMENTS

| 3,210,038 | 10/1965 | Bader et al. | 410/77 |
| 3,623,688 | 11/1971 | Ansund | 105/463 |
| 3,778,012 | 12/1973 | Fernandez | 410/69 |
| 3,810,534 | 5/1974 | Prete, Jr. | 410/69 |
| 3,933,101 | 1/1976 | Blas | 410/69 |
| 3,986,460 | 10/1976 | Voigt et al. | 410/69 |

Primary Examiner—Richard A. Bertsch
Attorney, Agent, or Firm—I. Morley Drucker

[57] ABSTRACT

An improved locking mechanism for securing cargo units and the like during transport has first and second complementary locking pawls carrying oppositely directed locking dogs, each pawl being pivotally mounted between spaced side supports for movement from a retracted position to a generally upright locked position. While the first pawl only is biased by spring means towards an upright position, it is held down in a retracted position by retaining portions of the second pawl. As the second pawl is lifted from the retracted position to the generally upright position, its retaining portions disengage from the first pawl permitting the first pawl to pivot upwardly to the generally upright position under the urging of the spring means simultaneously causing both the first and second pawls to move into mutually locking engagement. The spring means biasing the first pawl only is located in a sheltered non-exposed out-of-the way position between the spaced supports and below the upper edges of the spaced supports. The pawls are disengaged by manually moving the first pawl from the second pawl and enabling the second pawl to pivot downwardly to a retracted position where it again holds the first pawl in retracted position overcoming the spring bias.

9 Claims, 11 Drawing Figures

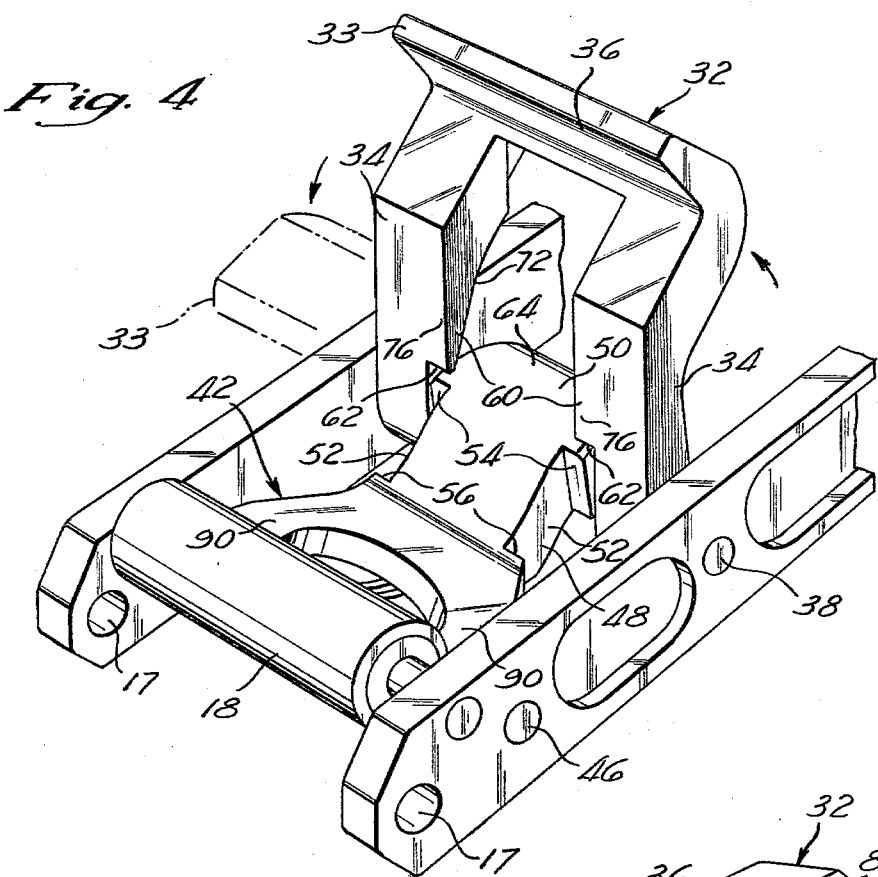
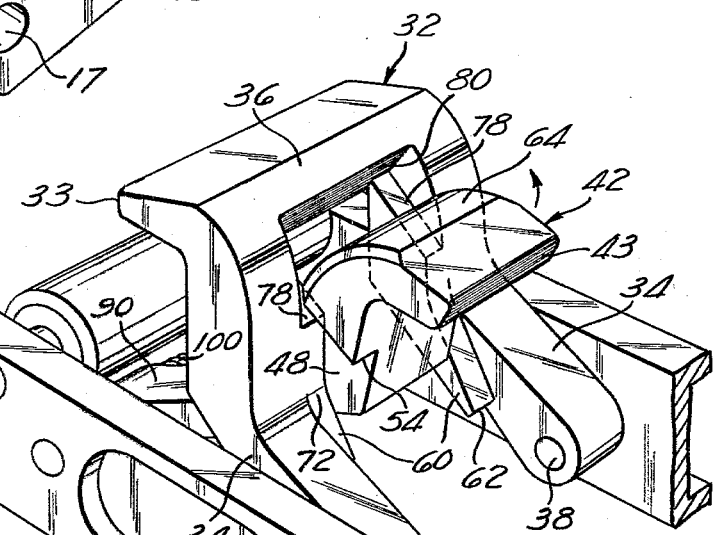
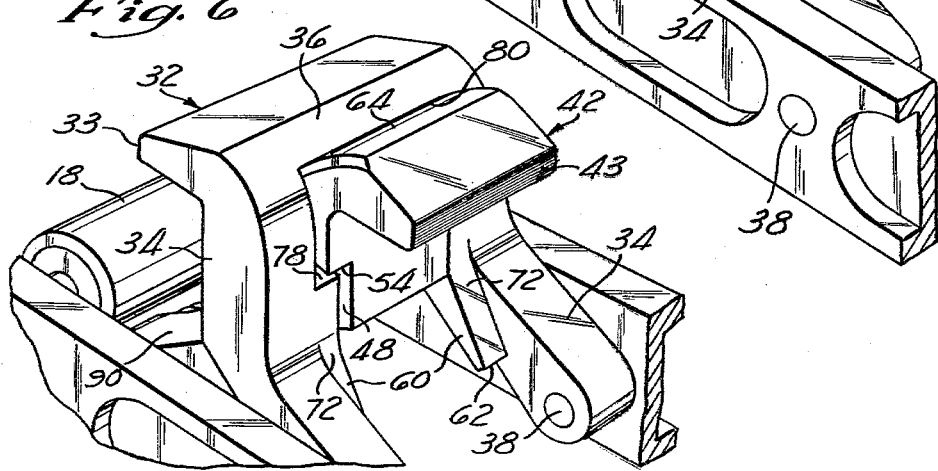

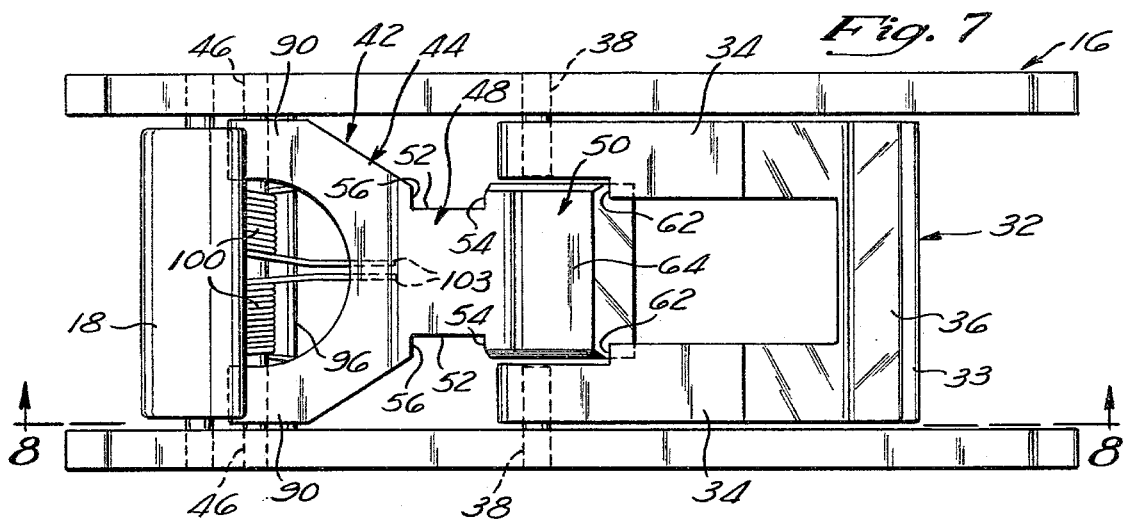
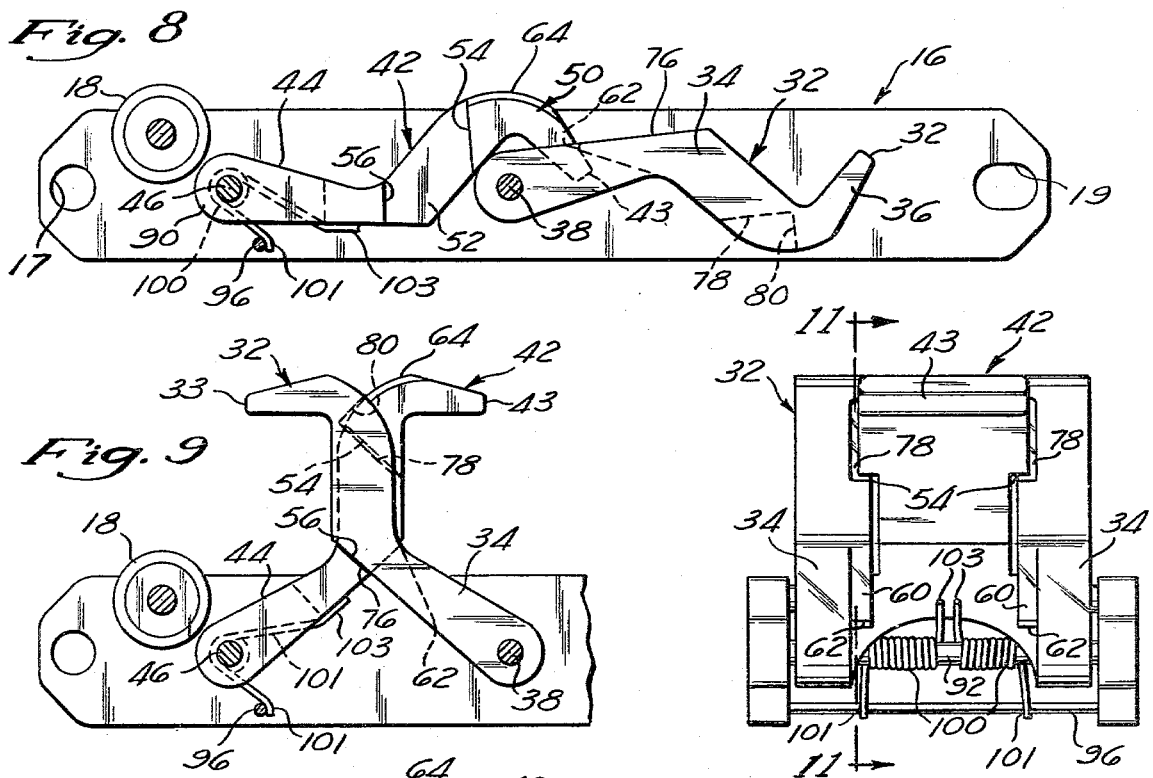
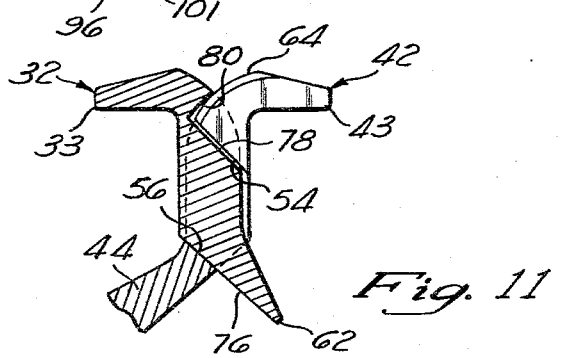

LOCKING DEVICES FOR CARGO AND THE LIKE

BACKGROUND OF THE INVENTION

1. Field of the Invention

This invention relates generally to cargo handling apparatus and more particularly, to improvements in apparatus adapted to restrain cargo units such as containers against movement during transport in a carrier.

2. Description of the Prior Art

Many cargo locking systems have been devised to solve the problem of shifting cargo while in transport in a carrier. This problem is particularly important in high speed aircraft carriers, where the cargo load is routinely subject to high rates of accelerations, requiring a strong and reliable fastening system. At the same time, it is desirable to provide a system that is simple to operate with a minimum of effort and whereby the cargo can be quickly secured or disengaged to minimize loading or unloading time in busy carrier terminals.

Representative of systems directed towards achieving these objectives are U.S. Pat. No. 3,204,581 issued Sept. 7, 1965 to Davidson, and U.S. Pat. No. 3,210,038 issued Oct. 5, 1965 to Bader et al.

Davidson discloses a cargo lock of complex structure using a pair of complementary locking dogs and incorporating a relatively large number of components. The locking operation calls for the manual erection of the two locking dogs and further manual engagement of a pair of locking arms.

Bader shows a simplified cargo latch requiring a single manual step for the locking engagement of a pair of spring linked locking dogs. However, the spring linkage of Bader is exposed to traffic and cargo loads and is thus liable to breakage, and has other disadvantages as well.

The present invention improves upon the prior art and furthers the objectives set forth above by providing a cargo locking device of more dependable construction and of easier and more trouble-free operation, by eliminating the spring linkage of Bader and providing, instead, an improved spring biased cargo locking means located within the device in a sheltered or protected manner.

SUMMARY OF THE INVENTION

The invention herein disclosed is directed to improvements in cargo latches or locking devices and comprises a pair of complementary outer and inner locking pawls pivotally mounted between spaced side supports and movable between a first, generally flat or retracted position and a second, generally, upright, interlocked, position.

Only the inner pawl is biased by a spring means towards an upright position but in the retracted position it is held down by retaining bead portions of the outer pawl. As the outer pawl is lifted from the retracted position to the generally upright position, its retaining bead portions disengage from the inner pawl permitting the inner pawl to continue its upward rotation to the generally upright position under the urging of the spring means and almost instantaneously engaging the outer pawl in mutually locking engagement. The pawls are disengaged by depressing the inner pawl and pivoting the outer pawl to a retracted position in which state the retaining bead portions of the outer pawl restrain the spring-urged inner pawl from any movement from the retracted position.

In the improved lock herein disclosed, the spring means comprises a torsion spring means mounted on the pivot axis of the inner pawl between, and below, the spaced side supports carrying the locking device. Furthermore, the spring means location of this invention is such that the inner pawl itself also shelters a free end of the torsion spring means—the free end engages only the underside, or non-exposed, surface of the inner pawl. In addition, the fixed end of the torsion spring means is also held between and below the spaced side supports of the locking device.

This novel arrangement has the important advantage that the spring means is in a completely sheltered position protected from accidental mechanical damage and possible breakage. If the spring means were exposed, as in Bader, U.S. Pat. No. 3,210,038, ready movement of the pawls to the retracted position or to the upright position could be unduly hindered. It is also possible that the person manually initiating the movement of the inner pawl could injure himself or catch his clothing, as the exposed spring means moves from the taut state to the unstretched state.

BRIEF DESCRIPTION OF THE DRAWINGS

FIG. 4 is a perspective view of the locking device of FIG. 3 with the pawls shown in a position intermediate that of the fully retracted pawl position and fully upright position; FIG. 5 is a perspective view of the locking device of the present invention, taken at right angles to, and from the rear of, FIG. 4. showing the locking pawls in a further intermediate position just prior to full locking engagement;

FIG. 6 is a partial perspective view of the locking device shown in FIG. 5 but showing the locking pawls in a position of full locking engagement;

FIG. 7 is a top plan view of the present invention shown in fully retracted position;

FIG. 8 is a side elevational cross-section taken along line 8—8 of FIG. 7;

FIG. 9 is a fragmentary, side-elevational, cross-section of the locking device of this invention taken along line 8—8 of FIG. 7 but showing the generally upright locked position of the locking pawls;

FIG. 10 is an end elevational view of my locking device as viewed from the right of FIG. 9 showing my device in locked position; and FIG. 11 is a partial cross-sectional view, in side elevation, taken along line 11—11 of FIG. 10.

DETAILED DESCRIPTION OF THE PREFERRED EMBODIMENT

By way of example only, the embodiment of the invention here described is used as a cargo lock adapted for use in aircraft to secure palletized or containerized cargo.

Figure 1:
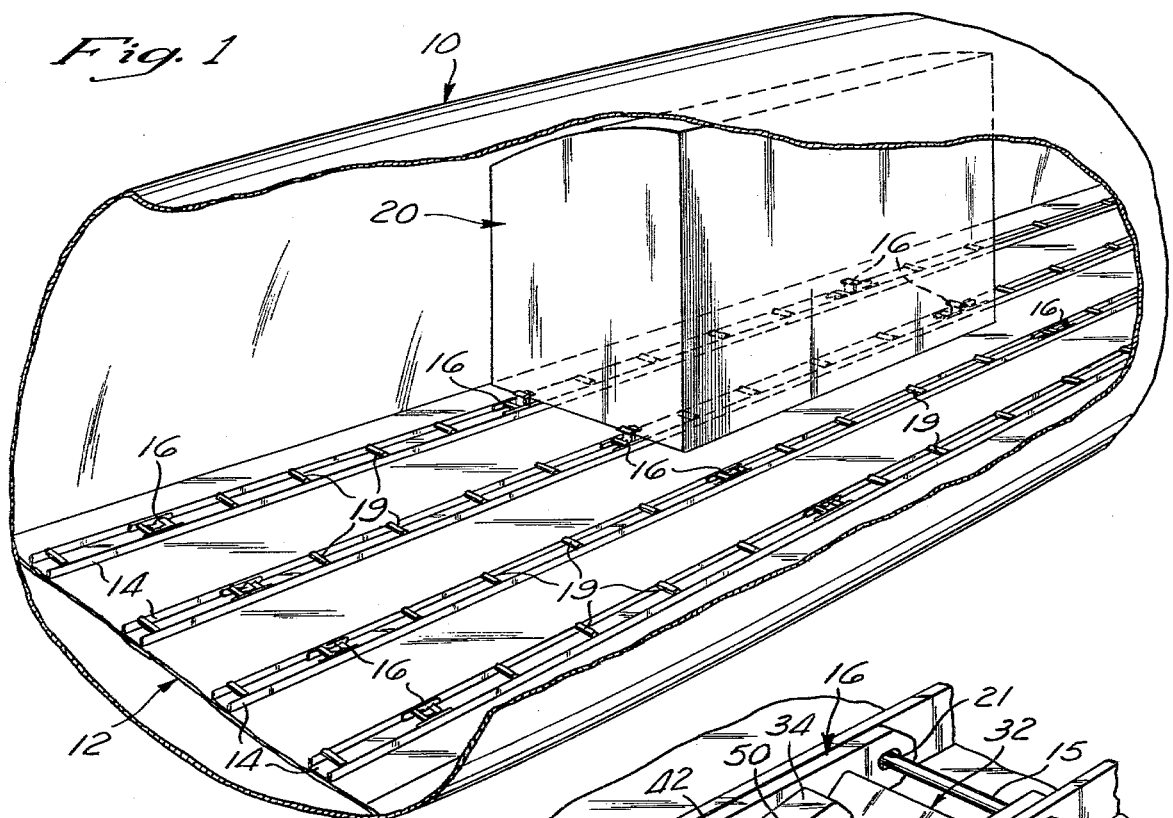
FIG. 1 is a fragmentary, cutaway, perspective view of an aircraft fuselage utilizing the present invention to secure a cargo container in place.

Referring now to the drawings wherein like numerals refer to like references, FIG. 1 shows the cargo hold of an aircraft fuselage 10 having a floor 12 in which are formed, or attached, parallel channels 14. Within channels 14 are secured the cargo locking devices 16 of this invention at precisely spaced intervals. A cargo container 20 of standardized dimensions is shown locked in position by two opposed pairs of cargo locks 16.

Figure 2:
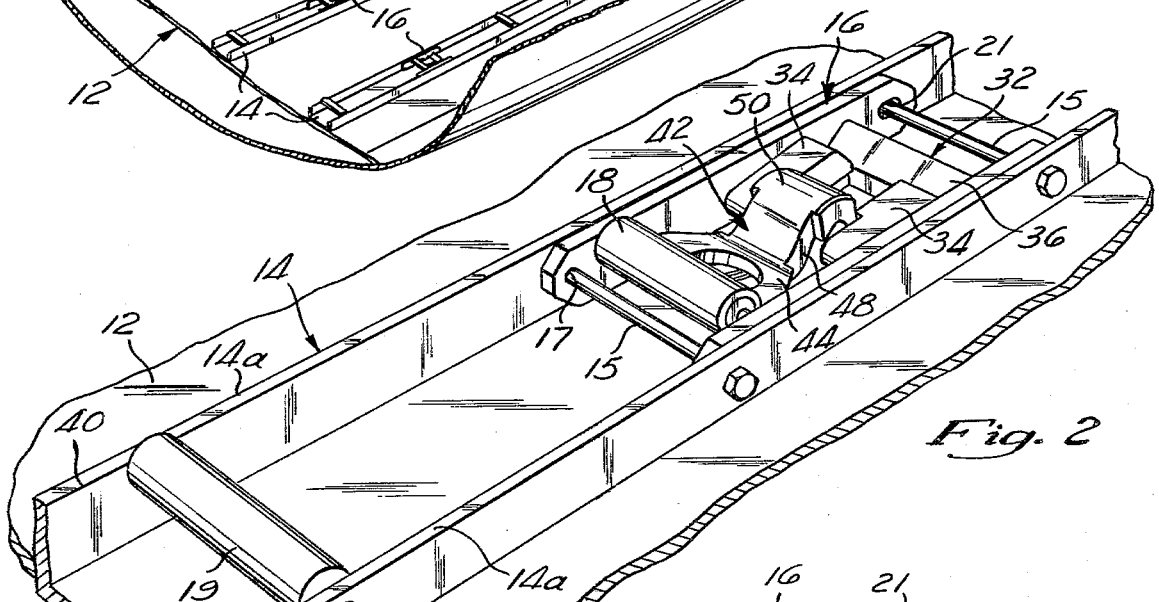
FIG. 2 is a perspective view of the locking device of the present invention installed in a retaining channel in the fuselage floor, the device being shown in retracted position.

In FIG. 2, the locking device 16 is shown in enlarged view, mounted within channel 14 by means of transverse rods 15 passing through end openings and slots 17, 21, respectively of the locking device 16, and being then bolted to channel 14 in a conventional manner. The locking device 16 is shown in retracted position in FIG. 2 and in such position, the entire structure lies below the upper edges 14a of channel 14 except for associated roller 18. In this way, the locking device 16 does not hinder movement of cargo units 20 over the roller 18 or over main rollers 19 rotatably affixed to the channel 14.

Figure 3:
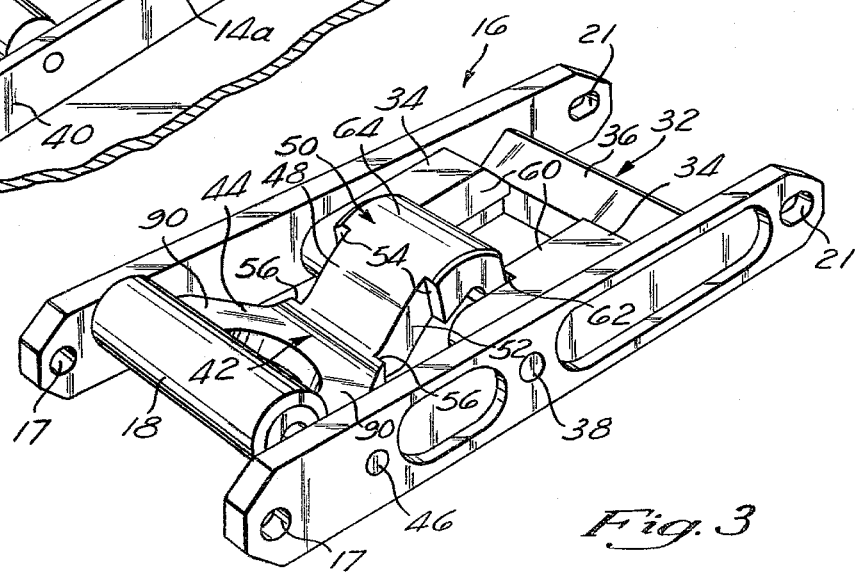
FIG. 3 is a perspective view of the cargo locking device of the present invention shown in retracted position and prior to its installation in a retaining channel.

In describing the locking device 16, pivotal movement of both locking pawls 32, 42 of the device from the retracted position of FIG. 3 to the upright position of FIG. 6 will be referred to as being in the counter-clockwise direction when necessary. The surfaces of the locking pawls 32, 42, are exposed in the retracted position of FIG. 3, will be referred to herein and in the claims, as frontal surfaces and the non-exposed surfaces of the pawls 32, 42 as rear surfaces. The various portions of each locking pawl 32, 42 will be described with reference to their respective pivot axes; thus, the portions of the pawls closest to the pivot axis are designated as radially inner portions and those portions of the pawls furthest from the pivot axis being designated as radially outer portions. The locking pawl 32 will sometimes be referred to herein and in the claims as the outer, or first locking pawl whereas the locking pawl 42 will be sometimes referred to herein and in the claims as the inner, or second, locking pawl.

Referring now to FIGS. 3 and 7, the cargo locking device 16 preferably comprises a U-shaped outer locking pawl 32 having a pair of radially inner legs 34 and a hook-shaped radially outer cross member 36. Legs 34 are pivotally mounted at their radially innermost ends by means of pivot pins 38 to channel side members 40. Inner locking pawl 42 has a radially inner base portion 44, terminating in radially inner legs 90 which are, in turn, pivotally mounted upon a transversely extending shaft 46, shaft 46 being fixedly mounted to side members 40 of channel 14.

A torsion spring 100 encircles shaft 46 and has one end 101 fixedly bearing against a transverse support shaft 96 mounted below the coil portion of the torsion spring 100, the other end 103 of spring 100 bearing against the rear surface, or underside of inner pawl 42 whereby inner pawl 42 is continuously biased towards a generally upright position.

The inner (or second) locking pawl 42 is provided with a narrow radially intermediate portion 48 relative to the width of base portion 44 and is also provided with a radially outer portion 50 that is wider then the transverse dimension of intermediate portion 48. The reduced width of radially intermediate portion 48 is thus provided with a pair of lateral grooves 52, the ends of which define radially outer surfaces 54 and radially inner locking surfaces 56.

Referring now to FIGS. 4, 5 and 6, the outer (or first) pawl 32 is provided with a pair of inwardly directed restraining, or bead, portions 60 carried by the interior portions of legs 34. The transverse spacing between bead portions 60 is slightly greater than the width of radially intermediate portion 48 of inner pawl 42. The bead portions 60 terminate at their radially inner ends in retaining edges 62.

In the retracted position of the locking device 16 shown in FIGS. 2 and 3, retaining edges 62 of bead portions 60 engage surfaces 64 of radially outer portion 50 of inner locking pawl 42 and retain the inner locking pawl 42 in the retracted position overcoming the upward force of the spring-loading of pawl 42 by virtue of the weight of outer pawl 32. As outer pawl 32 is manually pivoted upwardly from the retracted position of FIG. 3 through the positions shown in FIGS. 4-6 retaining edges 62 of bead portions 60 will reach the narrower grooves 52 of inner pawl 42 which mark the transition to the narrow central portion 48 of said inner pawl. The inner pawl 42 is then no longer restrained by the retaining edges 62 and the spring-loaded inner pawl 42 will then pivot upwardly, forcing restraining bead portions 60 into the grooves 52. Under the action of the torsion springs 100, the inner pawl 42 will continue its counter-clockwise movement against arcuate ramp surfaces 72 disposed on the rear surface of restraining bead portions 62 of outer pawl 32 until frontal surfaces 76 of the restraining bead portions 60 abut lower locking surfaces 56 of inner pawl 42 whereby further counter-clockwise motion of outer pawl 32 is prevented.

Almost instantaneously, frontal surfaces 64 of inner pawl 42 engages locking surface 80 formed on the rear surface of cross member 36. Upon such engagement, locking surface 80 prevents further pivotal, counter-clockwise movement of inner pawl 42, while the radially outer surfaces 78 of outer pawl 32, underlying radially outer locking surfaces 54 of inner pawl 42 prevents clockwise pivotal movement of outer pawl 32. Pawls 32 and 42 are thus in upright locking engagement as shown in FIGS. 6, 9 and 11.

The engagement and interaction of the various locking surfaces are further illustrated in FIGS. 9, 10 and 11. Specifically, the abutment of radially inner locking surfaces 76, 56 occurs at a substantially 135° included angle, measured in a counter-clockwise direction as viewed in FIG. 9 with respect to the plane drawn between the pivot axes of the pawls 32, 42 whereas the abutment of surfaces 80 and 64 occurs at about a 55° angle with respect to the same reference plane. The upper surfaces 78, 54 do not abut each other, the surfaces 54 being of larger included angle (by at least several degrees) than the included angle of surfaces 78. The divergency enables ready disengagement of inner pawl 42 from outer pawl 32 in its movement to the retracted position of FIG. 3.

The radially outermost portions of the pawls 32, 42 terminate in oppositely directed locking members or dogs 33, 43, respectively.

As will be appreciated from the above description and the drawings, torsion springs 100 are located in a protected out-of-the way position essentially below the upper edges 14a of, and between, the side channel members 40 regardless of whether inner pawl 42 is in the generally upright position of FIG. 9 or in the generally flat position of FIG. 8. The springs 100 bear only the inner pawl 42 thereby facilitating the compactness of the spring arrangement. The torsion springs 100 are further nested between legs 90 of the base portion 44 of inner pawl 42 with the fixed ends thereof 101 being secured well below the upper edges 14a of the channel members 40, and the biasing ends 103 bearing only on the rear or underside of pawl 42. Thus, neither cargo loads, nor operators are likely to come into contact with them. It is to be noted that spring means 100 are essential for the safe, and effective operation of the locking mechanism and it is thus highly desirable to shelter it in such manner, as described, from mechanical shock and potential damage or breakage.

It will be appreciated by those skilled in the art that many variations of the invention here disclosed are possible and therefore applicant is to be bound only by the claims which follow.

We claim:

1. In a cargo locking device having a pair of spaced supports, first and second locking pawls each pivotally mounted between said supports for movement between a generally flat position and a generally upright position with said first and second locking pawls carrying locking dogs extending in opposed directions when said first and second locking pawls are in their said generally upright position and means for locking the movement of said first and second locking pawls in said generally upright position, the improvement which comprises:
    spring means bearing only upon said second locking pawl biasing said second locking pawl towards a generally upright position; and
    at least one restraining member carried by said first locking pawl and engaging said second locking pawl when in said generally flat position to overcome the force of said spring means and thereby retain both said locking pawls in said generally flat position between said supports, said restraining member of said first locking pawl disengaging from said second locking pawl as said first locking pawl is pivotally moved to said generally upright position whereby said spring biased locking pawl also moves pivotally upward to said generally upright position under the urging of said spring means.

2. The cargo locking device of claim 1 wherein said spring means is mounted essentially entirely below the upper edges of said spaced supports and between said spaced supports throughout movement of said locking pawls from their generally flat position to their generally upright position.

3. The cargo locking device of claim 1 wherein said second locking pawl is provided with a base portion and said spring means is mounted in said base portion and essentially entirely below the upper edges of said spaced supports throughout movement of said locking pawls from their generally flat position to their generally upright position.

4. The cargo locking device of claim 1 wherein said second locking pawl is pivotally mounted about a transversely extending rod mounted between said spaced supports and below the upper edges of said spaced supports said spring means comprising a torsion spring means wound around said transversely extending rod with one end of said torsion spring means being fixed and the remaining end thereof engaging the unexposed side of said second locking pawl to urge said second locking pawl to its said generally upright position.

5. The cargo locking device of claim 1 wherein said second locking pawl is pivotally mounted about a transversely extending rod mounted between said spaced supports and below the upper edges thereof, said spring means comprising a pair of torsion springs wound around said transversely extending rod with the ends of each said torsion spring means being fixed below the said upper edges of said spaced supports, and the remaining ends of each said torsion spring means engaging the rear face of said second locking pawl to urge said locking pawl to its said generally upright position.

6. In a cargo locking device having a pair of spaced supports, the improvement which comprises:
    a first locking pawl pivotally mounted between said supports for movement about a first pivot axis, between a first, generally flat, position and a generally upright position including a locking dog projecting in a first direction;
    a second locking pawl pivotally mounted between said supports for movement about a second pivot axis between a first, generally flat, position and a generally upright position, including a locking dog projecting in a second direction opposed to that of said first direction;
    spring means bearing only upon said second locking pawl biasing said second locking pawl towards a generally upright position;
    at least one restraining member carried by said first locking pawl and engaging said second locking pawl when in said generally flat position to overcome the force of said spring means and thereby retain both said locking pawls in said generally flat position between and below said supports, said restraining member of said first locking pawl disengaging from said second locking pawl as said first locking pawl is pivotally moved to said generally upright position whereby said spring biased locking pawl also moves pivotally upward to said generally upright position under the urging of said spring means; and
    means for locking the movement of said first and second locking pawls in said generally upright position said means including angularly disposed abutment surfaces formed in said first and second locking pawls, said abutment surfaces being angularly disposed with respect to a reference plane passing through the said pivot axes of said first and second locking pawls.

7. The cargo locking device of claim 6 wherein said second locking pawl is provided with a radially inner base portion and said spring means is mounted in said base portion and essentially entirely below the upper edges of said spaced supports.

8. The cargo locking device of claim 6 wherein said second locking pawl is pivotally mounted about a transversely extending rod mounted between said spaced supports and below the upper edges thereof, said spring means comprising a torsion spring means wound around said transversely extending rod with one end of said torsion spring means being fixed and the remaining end thereof engaging the rear surface of said second locking pawl to urge said second locking pawl to its said generally upright position.

9. The cargo locking device of claim 6, wherein said means for locking the movement of said first and second locking pawls in said generally upright position further includes angularly disposed overlying but diverging surfaces formed in said first and second locking pawls, said further surfaces being angularly disposed with respect to said reference plane.

* * * * *